US011716655B2

(12) United States Patent
Woo et al.

(10) Patent No.: US 11,716,655 B2
(45) Date of Patent: *Aug. 1, 2023

(54) NETWORK-ADAPTIVE FUNCTION CONTROL METHOD FOR DUAL-MODE MOBILE TERMINAL

(71) Applicant: Samsung Electronics Co., Ltd., Suwon-si (KR)

(72) Inventors: Kwang Taek Woo, Daegu (KR); Chang Taek Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,306

(22) Filed: Oct. 5, 2021

(65) Prior Publication Data
US 2022/0030471 A1 Jan. 27, 2022

Related U.S. Application Data

(63) Continuation of application No. 16/667,291, filed on Oct. 29, 2019, now Pat. No. 11,178,581, which is a (Continued)

(30) Foreign Application Priority Data

Oct. 26, 2006 (KR) ........................ 10-2006-0104280

(51) Int. Cl.
*H04W 36/00* (2009.01)
*H04W 88/06* (2009.01)
(Continued)

(52) U.S. Cl.
CPC ... *H04W 36/0022* (2013.01); *H04M 1/72403* (2021.01); *H04M 1/72457* (2021.01);
(Continued)

(58) Field of Classification Search
CPC ..... H04W 88/06; H04W 36/14; H04W 84/12; H04W 48/18; H04W 48/16; H04W 28/16;
(Continued)

(56) References Cited

U.S. PATENT DOCUMENTS 6,735,432 B1 5/2004 Jarett et al.
7,069,330 B1 6/2006 McArdle et al.
(Continued)

FOREIGN PATENT DOCUMENTS

KR 10-2006-0131364 A 12/2006
KR 10-2007-0019443 A 2/2007
(Continued)

*Primary Examiner* — Golam Sorowar
(74) *Attorney, Agent, or Firm* — Jefferson IP Law, LLP

(57) ABSTRACT

A network-adaptive function control method is provided for a dual-mode mobile terminal. The network-adaptive function control method for a dual-mode mobile terminal supports communication via first and second-type networks includes registering at least one function as a network-adaptive; determining, when a function is requested to be activated, whether the requested function is the network-adaptive function. If it is determined that the requested function is the network-adaptive function, it if determined whether the mobile terminal is in the first-type network; and activating, if the mobile terminal is in the first-type network, the requested function in association with the first-type network. The network-adaptive function control method of the present invention allows registering portable IP network-friendly functions that are served only in a portable IP network domain but not in the cellular network domain, thereby restricting handover to the costly cellular network, resulting in reduction of communication cost.

18 Claims, 4 Drawing Sheets

Related U.S. Application Data continuation of application No. 14/584,321, filed on Dec. 29, 2014, now Pat. No. 10,499,288, which is a continuation of application No. 14/253,262, filed on Apr. 15, 2014, now Pat. No. 10,045,258, which is a continuation of application No. 11/977,316, filed on Oct. 24, 2007, now Pat. No. 8,805,436.

(51) Int. Cl.
*H04M 1/72403* (2021.01)
*H04M 1/72457* (2021.01)
*H04M 1/72469* (2021.01)
*H04M 1/72472* (2021.01)
*H04W 36/36* (2009.01)
*H04W 48/18* (2009.01)

(52) U.S. Cl.
CPC ... *H04M 1/72469* (2021.01); *H04M 1/72472* (2021.01); *H04W 36/0011* (2013.01); *H04W 36/365* (2013.01); *H04W 88/06* (2013.01); *H04W 48/18* (2013.01)

(58) Field of Classification Search
CPC ..... H04W 36/00835; H04W 36/00837; H04W 36/04; H04W 36/24; H04W 36/365; H04W 40/02; H04W 4/24; H04W 80/04; H04W 84/045; H04W 84/10; H04W 84/18; H04W 84/22; H04W 88/16; H04L 12/5692; H04L 67/06; H04L 67/14; H04L 12/1485; H04L 12/2856; H04L 29/06; H04L 41/5038; H04L 41/5087; H04L 41/5096; H04L 47/10; H04L 47/24; H04L 47/2441; H04L 63/0227; H04L 63/102; H04L 67/04; H04L 69/14; H04L 69/16; H04L 69/161; H04L 69/168; H04M 1/2535; H04M 1/27453; H04M 1/725; H04M 1/72519; H04M 1/72522; H04M 1/72563; H04M 1/72583; H04M 2207/18; H04M 2250/06; H04M 2250/64; H04M 7/006
See application file for complete search history.

(56) References Cited

U.S. PATENT DOCUMENTS

| | | | |
|---|---|---|---|
| 7,167,710 | B2 | 1/2007 | Thakkar et al. |
| 7,996,505 | B2 | 8/2011 | Krantz et al. |
| 2004/0054650 | A1* | 3/2004 | Chun ............... H04M 1/72403 |
| 2004/0068653 | A1 | 4/2004 | Fascenda |
| 2004/0127251 | A1 | 7/2004 | Thakkar et al. |
| 2004/0190493 | A1 | 9/2004 | Yao et al. |
| 2004/0267812 | A1 | 12/2004 | Harris et al. |
| 2005/0255879 | A1 | 11/2005 | Shi et al. |
| 2006/0030293 | A1 | 2/2006 | Karaoguz et al. |
| 2006/0045069 | A1* | 3/2006 | Zehavi ............... H04L 12/5692 370/352 |
| 2006/0121891 | A1 | 6/2006 | Jagadeesan et al. |
| 2006/0205392 | A1 | 9/2006 | Jagadeesan et al. |
| 2006/0209798 | A1 | 9/2006 | Oikarinen et al. |
| 2006/0209821 | A1* | 9/2006 | Jung ............... H04W 36/0066 709/250 |
| 2006/0286980 | A1 | 12/2006 | Hua |
| 2006/0291419 | A1 | 12/2006 | McConnell et al. |
| 2007/0091839 | A1* | 4/2007 | Abdelhamid ......... H04W 8/005 370/329 |
| 2007/0133665 | A1* | 6/2007 | Litwin ............... H04W 8/183 375/219 |
| 2007/0173283 | A1 | 7/2007 | Livet et al. |
| 2007/0211674 | A1 | 9/2007 | Ragnar Karlberg et al. |
| 2007/0217349 | A1 | 9/2007 | Fodor et al. |
| 2007/0260691 | A1 | 11/2007 | Kallqvist et al. |
| 2008/0056155 | A1 | 3/2008 | Lahtiranta et al. |
| 2008/0062881 | A1 | 3/2008 | Martin et al. |
| 2011/0026436 | A1 | 2/2011 | Karaoguz et al. |
| 2011/0029605 | A1 | 2/2011 | Barker |

FOREIGN PATENT DOCUMENTS

| | | |
|---|---|---|
| KR | 10-0706981 B1 | 4/2007 |
| WO | 03/001762 A2 | 1/2003 |
| WO | 2007/024693 A2 | 3/2007 |

* cited by examiner

NETWORK-ADAPTIVE FUNCTION CONTROL METHOD FOR DUAL-MODE MOBILE TERMINAL

CROSS-REFERENCE TO RELATED APPLICATION(S)

This application is a continuation application of prior application Ser. No. 16/667,291, filed on Oct. 29, 2019, which application is a continuation application of prior application Ser. No. 14/584,321, filed on Dec. 29, 2014, which has issued as U.S. Pat. No. 10,499,288, on Dec. 3, 2019, which is a continuation of a prior application Ser. No. 14/253,262, filed on Apr. 15, 2014, which has issued as U.S. Pat. No. 10,045,258, on Aug. 7, 2018, which is a continuation of prior application Ser. No. 11/977,316, filed on Oct. 24, 2007, which has issued as U.S. Pat. No. 8,805,436, on Aug. 12, 2014, and was based on and claimed priority under 35 U.S.C. § 119(a) of a Korean patent application number 10-2006-0104280, filed on Oct. 26, 2006, in the Korean Intellectual Property Office, the entire disclosures of each of which is incorporated by reference herein in its entirety.

BACKGROUND OF THE INVENTION

1. Field of the Invention

The present invention relates to a mobile terminal and handovers from an IP network to a cellular network. More particularly, the present invention relates to a network-adaptive function control method for a dual-mode mobile terminal.

2. Description of the Related Art

Wireless Application Protocol (WAP) is an international standard for wireless applications such as e-mail, messenger, picture exchange, and music file download applications. However, WAP is disadvantageous with regard to issues such as a slow connection speed, inconvenient user interface, and a high per-packet cost, thereby rendering WAP impractical for high traffic applications.

Recently, portable Internet service technologies have emerged that are expected to overcome at least some of the aforementioned problems by employing dual communication technologies, such as cellular/IP dual-mode technologies, in a single handheld casing. However, the current cellular/IP dual-mode mobile terminal has a drawback in performance in that a handover from an IP network to a cellular network causes unwanted cellular network utilization cost, because of the departure from a portable Internet service domain.

SUMMARY OF THE INVENTION

The present invention has been made in part in an effort to solve at least some of the above-mentioned problems, and to provide some of the advantages described herein below. A network-adaptive function control method for a dual-mode mobile terminal that is capable of controlling a handover between heterogeneous wireless network domains, i.e. the cellular and IP network domains.

Also, the present invention provides a network-adaptive function control method for a dual-mode terminal that is capable of restricting utilization of a service in the cellular network domain, which is costly in a cellular network domain, by using a cost-free IP network domain, thereby resulting in significant cost savings.

In an exemplary aspect of the present invention, the above and other objects are accomplished by a network-adaptive function control method for a dual-mode mobile terminal supporting communication via first-type and second-type networks. The network-adaptive function control method includes registering at least one function as a network-adaptive function; determining, when a function is requested to be activated, whether the requested function is the network-adaptive function; determining, if the requested function is the network-adaptive function, whether the mobile terminal is in the first-type network; and activating, if the mobile terminal is in the first-type network, the requested function in association with the first-type network.

BRIEF DESCRIPTION OF THE DRAWINGS

The above and other exemplary objects, features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the appreciation by a person of ordinary skill in the subject matter of the present invention.

In the following descriptions, the cellular network represents a Global System for Mobile communications (GSM), Code Division Multiple Access (CDMA), Universal Mobile Telecommunications System (UMTS), and/or any other type of cellular network. Also, the mobile terminal located in the cellular network accesses a data server using the WAP.

The term "data communication information" refers to the information used for transferring an ongoing communication session from a network domain to another one when the mobile terminal crosses the boundary between the two network domains.

The data communication information typically includes items such as communication progress status, source address, data name, and storage path in the mobile terminal.

In the following descriptions, it is assumed that the service charges and authentication information for both the cellular and mobile IP network are managed by a single operator. However, a person of ordinary skill in the art will appreciate that the present invention is not limited to the cellular and mobile IP network operator. The IP network represented typically includes networks such as a wireless local area network (WLAN), a wireless broadband (WiBro), etc.

The mobile terminal is enabled by an Unlicensed Mobile Access (UMA) that provides access to mobile services over unlicensed spectrum technologies Since the handover between the IP network and the cellular network is typically similar to that between the WLAN and GSM/GPRS/UMTS under the control of the UMA Network Controller (UNC), the present invention can be adapted for the interoperability between GSM/EDGE Radio Access Network (GE-RAN) and the WLAN specified in the UMA standard. In order to simplify the explanation, the portable Internet service and UMA network ranges is called the first domain and the cellular network is called the second domain in the following embodiments.

Figure 1:
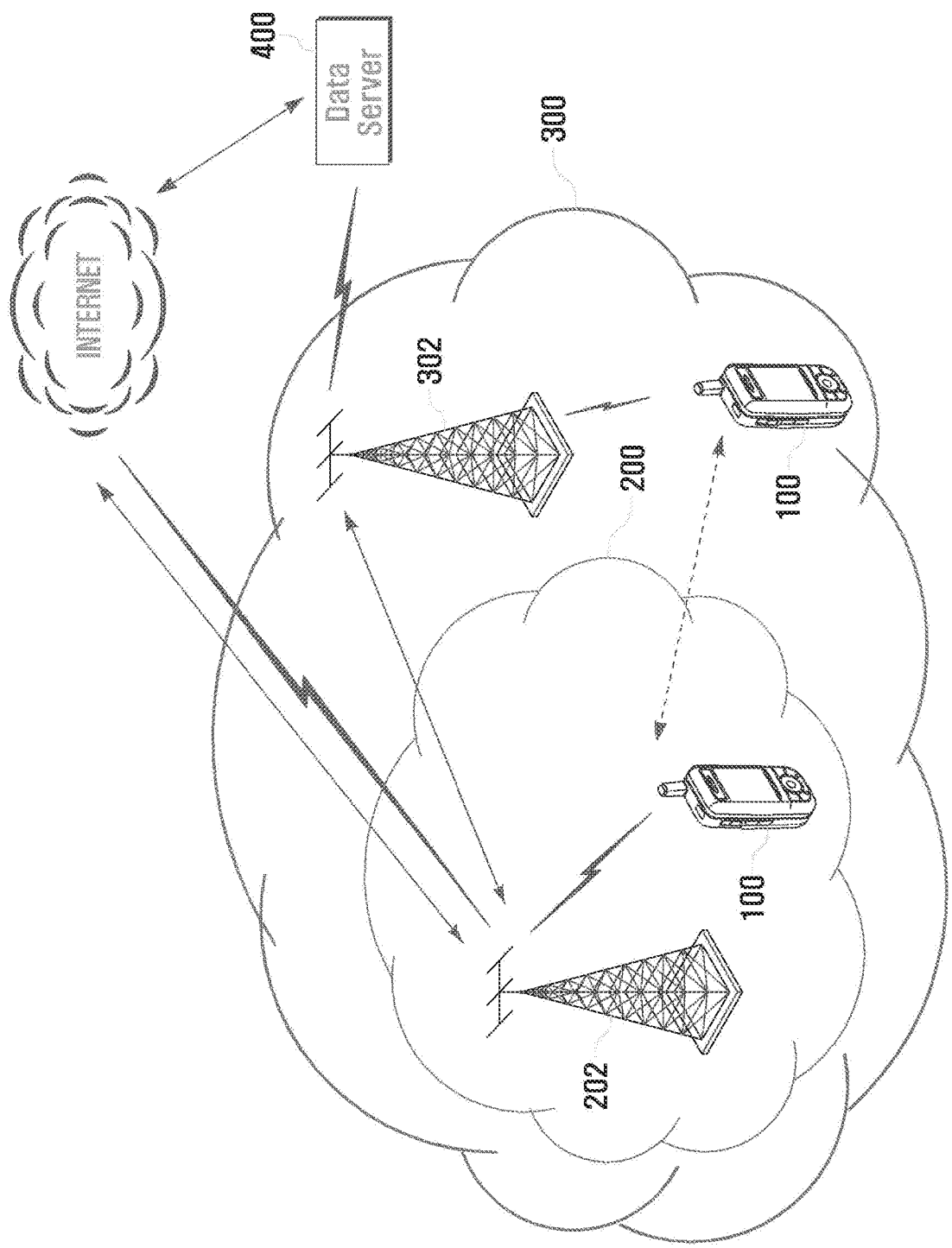
FIG. 1 is a schematic diagram illustrating a universal mobile communication system according to an exemplary embodiment of the present invention.

FIG. 1 is a schematic diagram illustrating an example of a universal mobile communication system according to an exemplary embodiment of the present invention.

Referring to FIG. 1, the universal mobile communication system typically includes a mobile terminal 100, a portable IP network 200, a cellular network 300 of which radio coverage typically overlaps that of the portable IP network 200, and a data server 400.

The mobile terminal 100 estimates the received signal strength from the base station of the portable IP network 200 and determines whether the mobile terminal 100 has departed (i.e. moved away) from the portable IP network 200 on the basis of the received signal strength.

The mobile terminal 100 accesses the data server 400 through one of the portable IP network 200 and the cellular network 300.

In order to enable communication with the portable IP network 200 and the cellular network 300, the mobile terminal is provided with an IP network interface module and a cellular network interface module.

Still referring to FIG. 1, when, based on received signal strength, it is determined that there is a departure from the area of the portable IP network 200 determined while communicating with the data server 400 through the portable IP network 200, the mobile terminal 100 performs a handover to the cellular network 300 for maintaining the communication with the data server 400. On the other hand, if the mobile terminal 100 detects a received signal strength sufficient to communicate with the portable IP network 200 while communication with the data server 400 through the cellular network 300, the mobile terminal 100 performs a handover to the portable network 200. The handover between the portable IP network 200 and the cellular network 300 is performed on the basis of the data communication information stored in the mobile terminal 100.

The portable IP network 200 provides the mobile terminal 100 located in its radio coverage with a wireless Internet access and communication services. That is, the portable IP network 200 connects the mobile terminal 100 located in its radio coverage to the data server 400.

The portable IP network 200 is typically defined, for example, by a portable IP network base station 202. The portable IP network base station provides an access service for the mobile terminal 100 to the data server 400.

The cellular network 300, via base station 302, connects the mobile terminal 100 to the data server 400 when the mobile terminal 100 has departed (left) from the portable IP network 200. A person of ordinary skill in the art will appreciate that, in a non-limiting example, as the received signal strength continues to be reduced, a handover may preferably occur before the mobile terminal is completely out of the range of the portable IP network so there is no loss of communication.

The data server 400 stores various data such as game, still and motion pictures, and MP3 files and allows the mobile terminal 100 to download the data. The data server 400 can be, for example, a contents provider server and an e-mail server.

Figure 2:
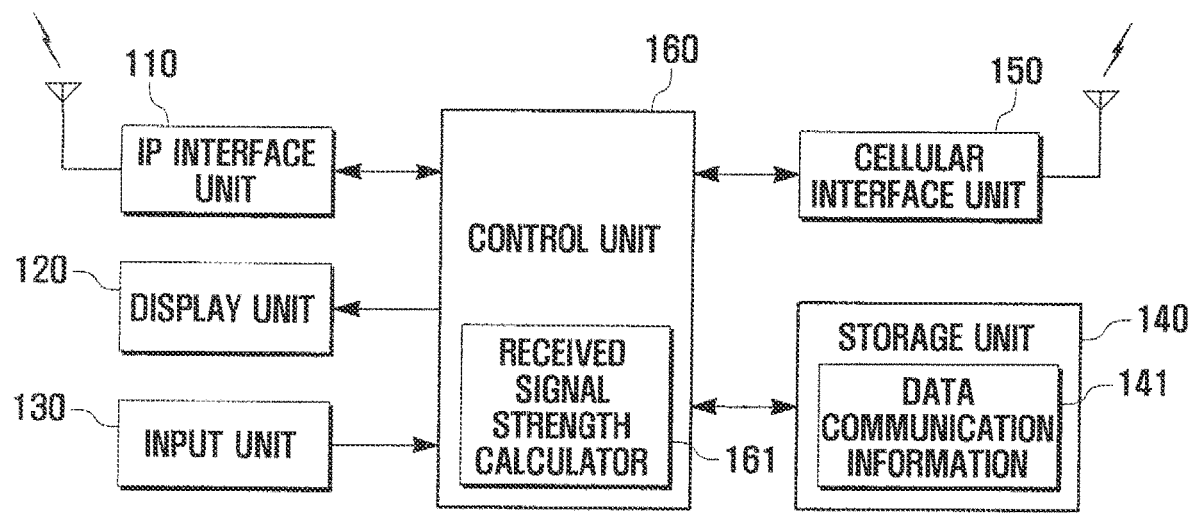
FIG. 2 is a block diagram illustrating an example of a configuration of the mobile terminal of FIG. 1.

FIG. 2 is a block diagram illustrating an example of a configuration of the mobile terminal of FIG. 1.

Referring to the examples shown in FIGS. 1 and 2, the mobile terminal 100 typically includes an IP interface unit 110, a display unit 120, an input unit 130, a storage unit 140, a cellular interface unit 150, and a control unit 160 having a received signal strength calculator 161.

The portable IP interface unit 110 provides communication with the portable IP network 200 such that the mobile terminal 100 downloads data from the data server 400 via the portable IP network 200.

The display unit 120 can be implemented with a display such as, for example, liquid crystal display (LCD) and displays various data and operational status of the mobile terminal on a display screen. A person of ordinary skill in the art should understand and appreciate that any type of display screen suitable for a mobile terminal can also be used.

In this exemplary embodiment, particularly, the display unit 120 displays a menu screen listing function items such that a user can select a function as the IP network-friendly function to be activated only in the portable IP network domain. The control unit 160 configures the mobile terminal such that the IP network-friendly function selected on the menu screen activates in the portable IP network domain.

The input unit 130 can be implemented with at least one of a touchscreen, a touchpad and stylus, and/or a keypad, each providing a plurality of function keys and alphanumeric keys. The input unit 130 also transfers the signals generated by a key input to the control unit 160. It is also possible that at least some of the functions of the input unit could be voice activated.

In this exemplary embodiment, particularly, the input unit 130 is implemented to permit the selection of functions in association with function items listed on the menu screen by key manipulation.

The storage unit 140 stores application programs for operating the mobile terminal and data generated during the operations.

In this exemplary embodiment, particularly, the storage unit 140 stores the data communication information 141. The data communication information 141 includes the progress status, source address, data name, and storage path in the mobile terminal.

Still referring to FIG. 2, the cellular interface unit 150 includes a radio frequency (RF) transmitter for up-converting and amplifying signals to be transmitted and an RF receiver for low noise-amplifying and down-converting the received signals. The cellular interface unit 150 is responsible for radio communication with the cellular network 300.

In the exemplary embodiment shown in FIG. 2, the cellular interface unit 150 is typically configured to maintain data communication between the mobile terminal 100 and the data server 400 via the portable IP network 200 after the frequency handover from the portable IP network 200 to the cellular network 300.

The control unit 160 controls general operations of the mobile terminal 100.

Figure 3:
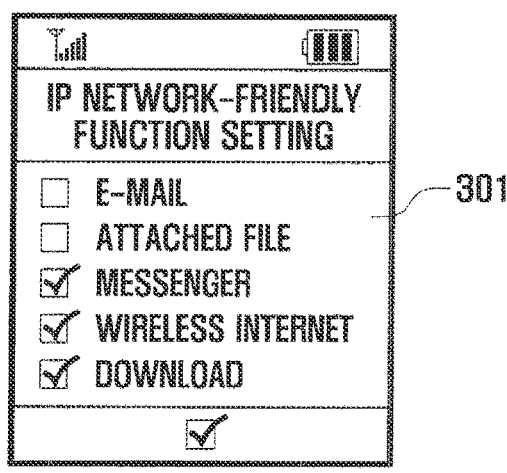
FIG. 3 is an example of a screen image illustrating an IP network-friendly function setting screen of the mobile terminal of FIG. 2.

Still referring to FIG. 3, the control unit 160 checks whether an IP network-friendly function has been set. The control unit 160 also monitors the frequency channel of the portable IP network 200 to detect whether the mobile terminal 100 departs from the portable IP network 200. The departure of the mobile terminal from the portable IP network 200 to the cellular network is determined on the basis of the received signal strength from the base station 201 of the portable IP network 200.

FIG. 3 is an example of a screen image illustrating an IP network-friendly function setting screen of the mobile terminal of FIG. 2. This screen image would typically be displayed by a display screen of the display unit 120.

Referring to FIG. 3, the IP network-friendly function setting screen 301 lists the function items with respective check boxes such that each of the function items is set to operate in the portable IP network domain by checking in the check box through the input unit 130.

The IP network-friendly functions can be grouped, for example, by the type of communication, such that the group of data communication functions can be enabled or disabled according to the user setting.

Figure 4:
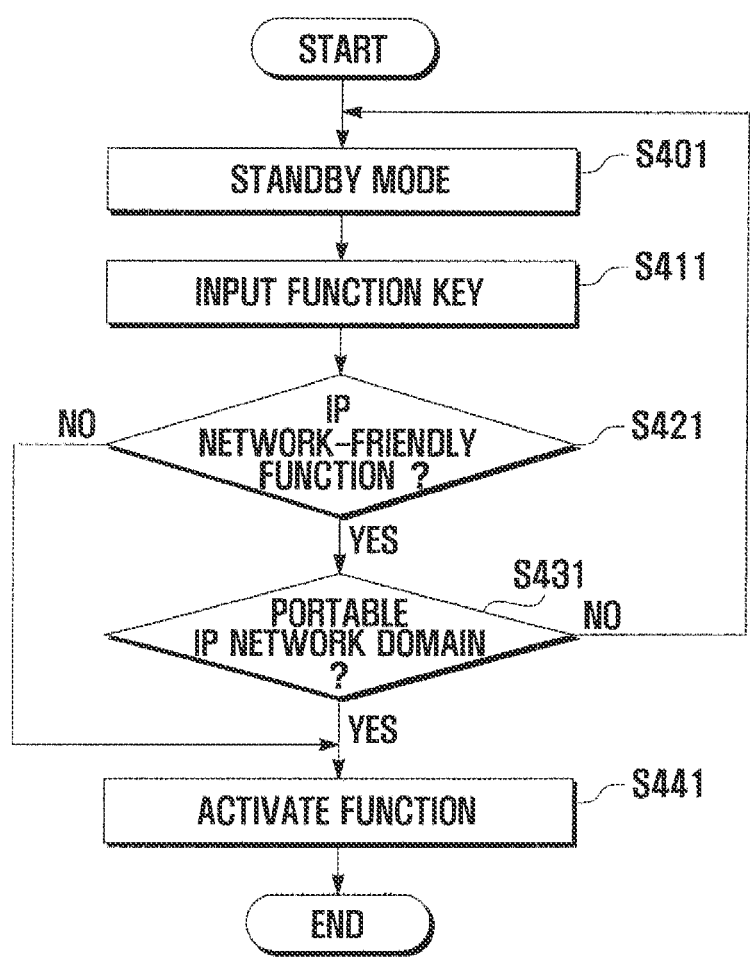
FIG. 4 is a flowchart illustrating a network-adaptive function control method for a dual-mode mobile terminal according to an exemplary embodiment of the present invention.

FIG. 4 is a flowchart illustrating an operational example of a network-adaptive function control method for a dual-mode mobile terminal according to an exemplary embodiment of the present invention.

Referring to FIG. 4, the mobile terminal 100 is turned on so as to be in a standby mode (S401) and the control unit 160 (shown in FIG. 3) of the mobile terminal 100 detects an input of a function key for executing a specific function of the mobile terminal 100 (S411).

At step (S421), a decision is made, in that if the function key input is detected, the control unit 160 determines whether the function indicated by the function key is registered as an IP network-friendly function. In order to determine whether the function is registered as an IP network-friendly function, the control unit 160 compares the sequence generated by the function key input with reference sequences of the IP network-friendly functions registered through the IP network-friendly function setting screen of FIG. 3.

If the function indicated by the function key input is not an IP network-friendly function (the answer to step 421 being negative), the control unit 160 performs the function (S441).

However, if the function indicated by the function key input is determined as one of the IP network-friendly functions (the answer to step 421 being affirmative), the control unit 160 determines whether the mobile terminal is located within the portable IP network domain (S431).

If the mobile terminal is located within the portable IP network domain, the control unit 160 performs the IP network-friendly function requested by the function key input (S411).

Whether the mobile terminal is located within the portable IP network domain is determined on the basis of the signal strength received from the base station of a portable IP network.

If the mobile terminal 100 is not located within the portable IP network domain, the control unit 160 rejects performing the IP network-friendly function requested by the function key input and repeats step S401.

With reference to the example of the IP network-friendly function setting screen 301 of FIG. 3 in which the messenger, wireless Internet, and download functions are checked to be registered as the IP network-friendly functions.

Accordingly, to summarize, if a messenger function activation key is input at step S411, the control unit 160 determines whether the messenger function is one of the IP network-friendly functions at step S421. Since the messenger function is the IP network-friendly function as shown in FIG. 3, the messenger function operates only within the portable IP network domain. Thus, the control unit 160 determines whether the mobile terminal is located within the portable IP network domain at step S431. In order to determine that the mobile terminal is in the portable IP network domain, the control unit 160 determines whether the received signal strength received from a base station of a portable IP network is greater than a threshold value.

If it is determined that the mobile terminal 100 is within the portable IP network domain, the control unit 160 activates the messenger function and otherwise repeats step S401.

Figure 5:
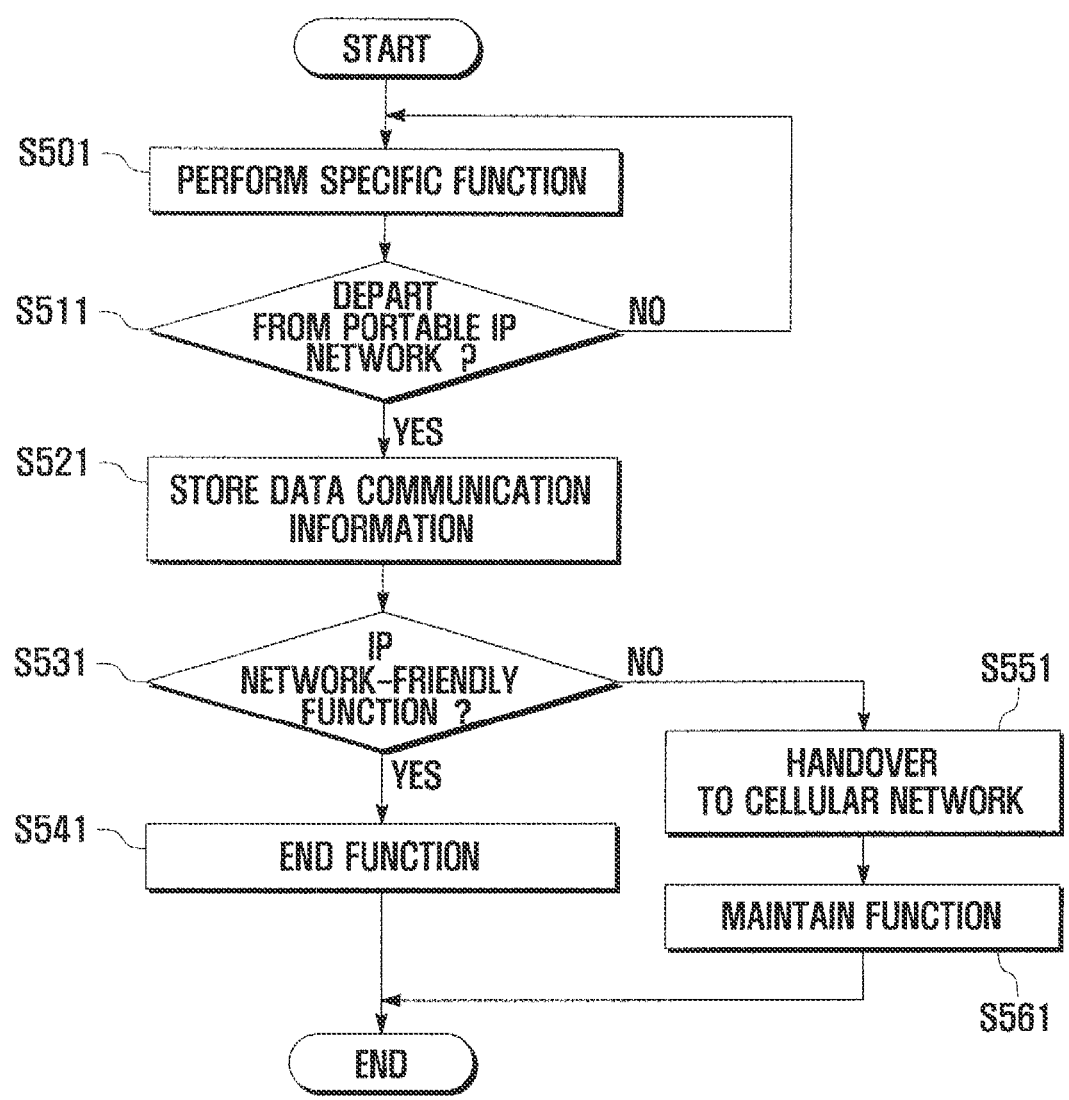
FIG. 5 is a flowchart illustrating a network-adaptive function control method for a dual-mode mobile terminal according to another exemplary embodiment of the present invention.

FIG. 5 is a flowchart illustrating exemplary operations of a network-adaptive function control method for a dual-mode mobile terminal according to another exemplary embodiment of the present invention.

Referring to FIG. 5, the mobile terminal 100 operates a data communication function, such as the messenger, wireless Internet, and download functions, in the portable IP network domain (S501).

The control unit 160 monitors the communication channel with the portable IP network and determines whether the mobile terminal 100 has departed from the area of the portable IP network domain (S511). If the received signal strength is less than a threshold, the control unit 160 determines that the mobile terminal is departed from the portable IP network domain. The monitoring from the control unit 160 may be either periodic or continuous.

If at (S511) it is determined that the mobile terminal 100 has departed from the range of the portable IP network domain, then at (S521) the control unit 160 stores the data communication information of the data communication function and determines whether the data communication function is registered as an IP network-friendly function (S531).

The data communication information includes, for example, the communication progress status, source address, data name, and storage path in the mobile terminal. In the case of the download function, the data communication information includes the name of the file, address of the server providing the file, download progress, etc.

At (S541), if the data communication function is registered as an IP network-friendly function, the mobile terminal 100 ends the data communication function. The data communication information can then be used to restart the IP network-friendly function in consideration of the progress of the communication in the previous session, when the mobile terminal 100 enters the portable IP network domain again. In one exemplary aspect of the present invention, when the mobile terminal returns to within the portable IP network the mobile terminal 100 may display a prompt asking the user if they want to continue with previous communication, such as continuing to finishing downloading the information. It could be a period of time before the mobile terminal has returned to range to use the portable IP network and the downloaded information may no longer be relevant or desired by the user. The mobile terminal may also display a prompt asking the user whether the partially download information should be erased to free up storage.

If the data communication function is not registered as an IP network-friendly function, the mobile terminal performs a handover to the cellular network (S551) and then maintains the data communication function (S561).

Although the procedure is depicted to end with the IP-network friendly function termination, the handover process and function restart process (S551 and S561) can be performed with a specific option even outside the portable IP network domain.

According to the present invention, the handover from the portable IP network to the cellular network is formed seamlessly such that the communication breakage is not perceived.

Although exemplary embodiments of the present invention are described in detail hereinabove, it should be clearly understood that many variations and/or modifications of the basic inventive concepts herein taught which may appear to those skilled in the present art will still fall within the spirit of the present invention and the scope of the appended claims.

As described above, the network-adaptive function control method for a dual-mode mobile terminal according to the present invention allows registering portable IP network-friendly functions that are served only in a portable IP network domain but not in the cellular network domain, thereby restricting handover to the costly cellular network, resulting in a reduction of communication costs. Also the registering of at least one network-adaptive function may include providing a changeable default regarding one of (i) prompting of resumption of the network-adaptive function is desired, and (ii) automatically resuming the network-adaptive function upon a detected return of the mobile terminal to within a communicative range of the first-type network.

What is claimed is:

1. A portable communication device comprising:
   memory adapted to store a menu including a first user interface and a second user interface to receive a user input to set a network setting for a first communication-based function and a second communication-based function, respectively; and
   a processor operatively coupled with the memory, the processor adapted to:
      identify the network setting for the first communication-based function set previously via the first user interface;
      if the network setting of the first communication-based function is a first network setting, perform a communication for the first communication-based function using a wireless local area network or a cellular network; and
      if the network setting of the first communication-based function is a second network setting, perform the communication for the first communication-based function using the wireless local area network, and not the cellular network.

2. The portable communication device of claim 1, wherein the processor is adapted to:
   change the network setting of the first communication-based function between the first network setting and the second network setting based at least in part on another user input received via the first user interface; and
   change the network setting of the second communication-based function between the first network setting and the second network setting based at least in part on another user input received via the second user interface.

3. The portable communication device of claim 1, wherein the processor is adapted to:
   as part of each of the first and second user interfaces, display an indication indicative of a corresponding one of the first network setting and the second network setting.

4. The portable communication device of claim 1, wherein the wireless local area network is at least one of a Wireless-Fidelity (Wi-Fi) network, a Wireless-Broadband (Wi-Bro) network, or a Wireless Local Area Network (WLAN).

5. The portable communication device of claim 1, wherein the processor is adapted to:
   if the network setting of the first communication-based function is set in the first network setting, maintain the communication using the cellular network even when the portable communication device is out of a communicative range supported by the wireless local area network; and
   if the network setting of the first communication-based function is set in the second network setting, stop the communication when the portable communication device is out of the communicative range supported by the wireless local area network.

6. The portable communication device of claim 5, wherein the processor is adapted to:
   if the network setting of the first communication-based function is set in the second network setting, display another user interface to receive another user input to resume the communication when the portable communication device returns to the communicative range supported by the wireless local area network.

7. A portable communication device comprising:
   memory adapted to store a menu including a first user interface and a second user interface to receive a user input to set a network setting for a first communication-based function and a second communication-based function, respectively; and
   a processor operatively coupled with the memory, the processor adapted to:
      identify the network setting for the first communication-based function set previously via the first user interface;
      if the network setting for the first communication-based function is a first network setting, perform a first communication for the first communication-based function using a wireless local area network or a cellular network;
      identify the network setting for the second communication-based function set previously via the second user interface; and
      if the network setting of the second communication-based function is a second network setting, perform a second communication for the second communication-based function using the wireless local area network, and not the cellular network.

8. The portable communication device of claim 7, wherein the processor is adapted to:
   change the network setting of the first communication-based function between the first network setting and the second network setting based at least in part on another user input received via the first user interface; and
   change the network setting of the second communication-based function between the first network setting and the second network setting based at least in part on another user input received via the second user interface.

9. The portable communication device of claim 7, wherein the processor is adapted to:

as part of each of the first and second user interfaces, display an indication indicative of a corresponding one of the first network setting and the second network setting.

10. The portable communication device of claim 7, wherein the wireless local area network is at least one of a Wireless-Fidelity (Wi-Fi) network, a Wireless-Broadband (Wi-Bro) network, or a Wireless Local Area Network (WLAN).

11. The portable communication device of claim 7, wherein the processor is adapted to:
   if the network setting of the first communication-based function is set in the first network setting, maintain the first communication using the cellular network even when the portable communication device is out of a communicative range supported by the wireless local area network; and
   if the network setting of the first communication-based function is set in the second network setting, stop the first communication when the portable communication device is out of the communicative range supported by the wireless local area network.

12. The portable communication device of claim 7, wherein the processor is adapted to:
   if the network setting of the first communication-based function is set in the second network setting, display another user interface to receive another user input to resume the first communication when the portable communication device returns to a communicative range supported by the wireless local area network.

13. A non-transitory storage medium storing instructions that, when executed by a computer, cause the computer to perform operations comprising:
   storing, in memory of the computer, a network setting for a first communication-based function and a second communication-based function based at least in part on a user input received via a first user interface and a second user interface, respectively, included in a same menu;
   identifying, using a processor of the computer, the network setting of the first communication-based function set previously via the first user interface;
   performing, using the processor, a first communication for the first communication-based function using a wireless local area network or a cellular network, if the network setting of the first communication-based function is a first network setting;
   identifying, using the processor, the network setting of the second communication-based function set previously via the second user interface; and
   performing, using the processor, a second communication for the second communication-based function using the wireless local area network, and not the cellular network, if the network setting of the second communication-based function is a second network setting.

14. The non-transitory storage medium of claim 13, wherein the operations include:
   changing the network setting of the first communication-based function between the first network setting and the second network setting based at least in part on another user input received via the first user interface; and
   changing the network setting of the second communication-based function between the first network setting and the second network setting based at least in part on another user input received via the second user interface.

15. The non-transitory storage medium of claim 14, wherein the operations include:
   changing a first indication included in the first user interface indicating the network setting of the first communication-based function in response to the user input; and
   changing a second indication included in the second user interface indicating the network setting of the second communication-based function in response to the other user input.

16. The non-transitory storage medium of claim 13, wherein the wireless local area network is at least one of a Wireless-Fidelity (Wi-Fi) network, a Wireless-Broadband (Wi-Bro) network, or a Wireless Local Area Network (WLAN).

17. The non-transitory storage medium of claim 13, wherein the operations include:
   if the network setting of the first communication-based function is set in the first network setting, maintaining the first communication using the cellular network even when a portable communication device is out of a communicative range supported by the wireless local area network, and
   if the network setting of the first communication-based function is set in the second network setting, refrain from communicating when the portable communication device is out of the communicative range of the wireless local area network.

18. The non-transitory storage medium of claim 13, wherein the operations include:
   displaying another user interface to receive another user input to resume the first communication when a portable communication device returns to a communicative range supported by the wireless local area network.

* * * * *